BRAKE

INVENTORS
KANEO SAITO
HIDEO KOKUBO

INVENTORS
KANEO SAITO
HIDEO KOKUBO

BRAKE

INVENTORS
KANEO SAITO
HIDEO KOKUBO

INVENTORS
KANEO SAITO
HIDEO KOKUBO

United States Patent Office 3,384,319
Patented May 21, 1968

---

3,384,319
FILM WINDING DEVICE
Kaneo Saito and Hideo Kokubo, Tokyo, Japan, assignors to Konishiroku Photo Industry Co., Ltd., Tokyo, Japan
Filed Aug. 9, 1966, Ser. No. 571,324
10 Claims. (Cl. 242—71.1)

ABSTRACT OF THE DISCLOSURE

A film winding device comprising a sprocket wheel in meshing engagement with a winding shaft and also engaging the film to be wound, a reel made up of an outer and an inner cylindrical member, the members having slots on their perimeters so that the leading edge of the film advances therethrough, means for preventing free rotation of the outer member, means coupling the inner member with the winding shaft so that the inner member is rotated after the film has entered into the slots and is pinched therein.

---

This invention relates to a film winding device for 35 mm. photographic cameras and more particularly to such device in which a reel for winding an exposed film comprises outer and inner members each provided on its perimeter with a plurality of slots for allowing the leading edge of the film to advance therethrough. The invention also relates to an automatic film loading device for cameras employing the reel above specified.

For film winding reels of cameras, it has been conventional in the prior art to provide a pawl or click on the periphery of such reels or spools, which was adapted to be engaged with an opening provided in the leading edge of a film to be wound. Usually the engagement was not a simple operation and required a certain degree of skill, since an operator had to find out the pawl, fit it in the opening of the film and rotate the spool to wind an initial length of the film without causing the disengagement of the latter.

It is therefore the purpose of the invention to provide an improved film winding device for photographic cameras in which the film edge can be firmly held and the film wound through a simple operation.

It is another purpose of the invention to provide such film winding device which can be easily mounted in cameras having a film winding reel to replace the latter, thereby simplifying the film loading operation and ensuring a reliable film winding operation.

An automatic film loading device is also known, in which the film end need not be operated manually. One of such devices includes a film chamber in which is provided a winding shaft which in turn carries several film holding members elastically. Such construction of the automatic loading device has a disadvantage that the film face is subject to considerable friction, since the film is fed by frictional engagement with the holding members. Moreover, the film is initially wound only loosely and gradually tightened as it is rolled under the entering film. This results in an additional friction between film faces of adjacent layers and involves a danger of causing an unreliable winding operation.

It is therefore another object of the invention to provide an improved automatic film loading device which assures a positive winding operation while permitting to avoid undesirable friction of the film face.

Figure 1:
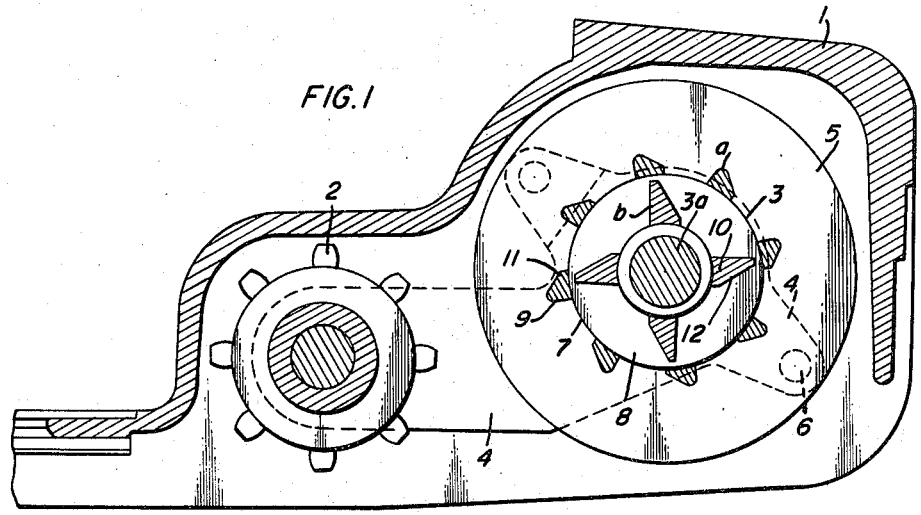
Figure 3:
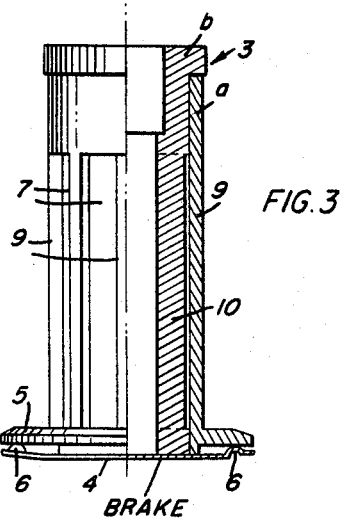
Figure 6:
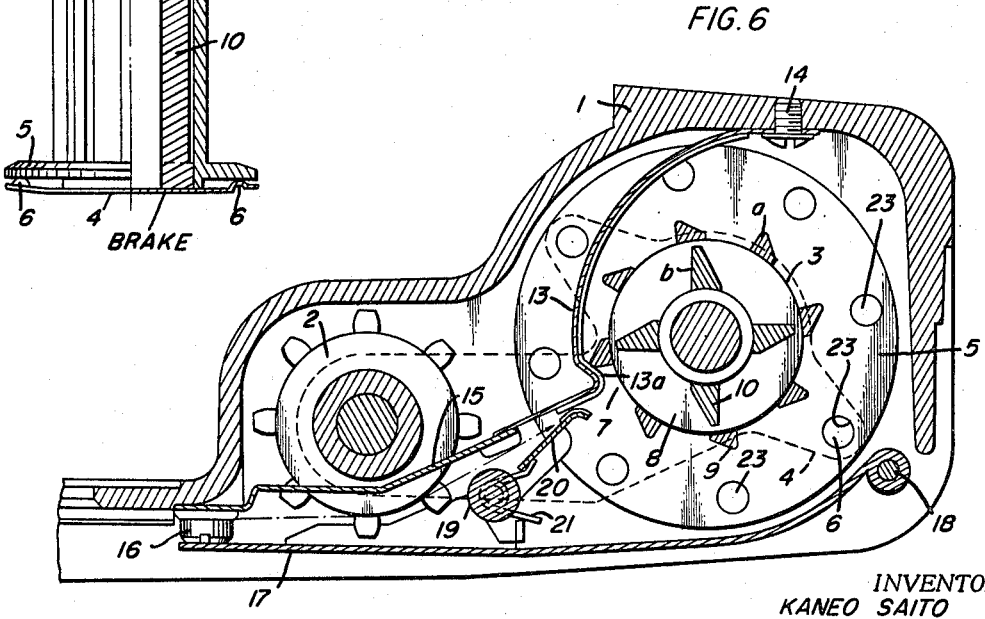
Figure 2:
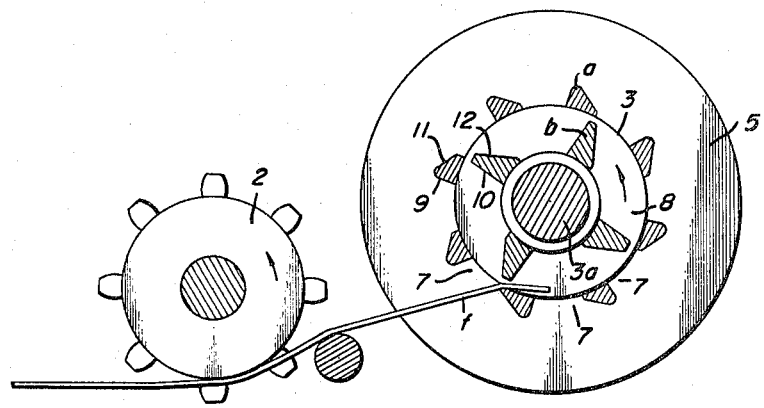
Figure 4:
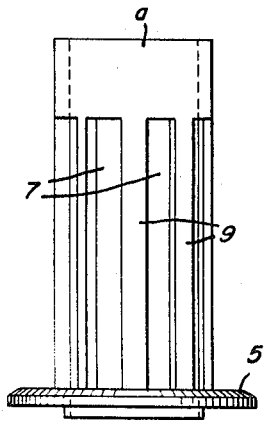
Figure 5:
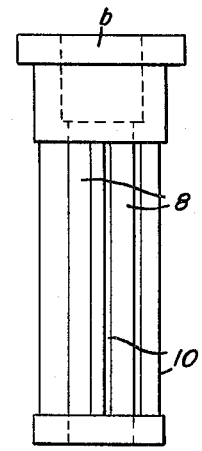
Figure 8:
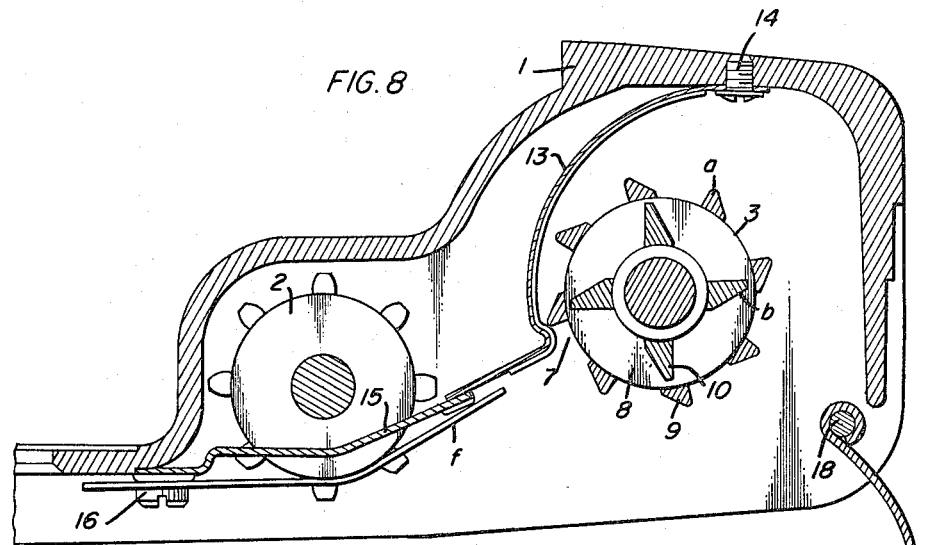
Figure 7:
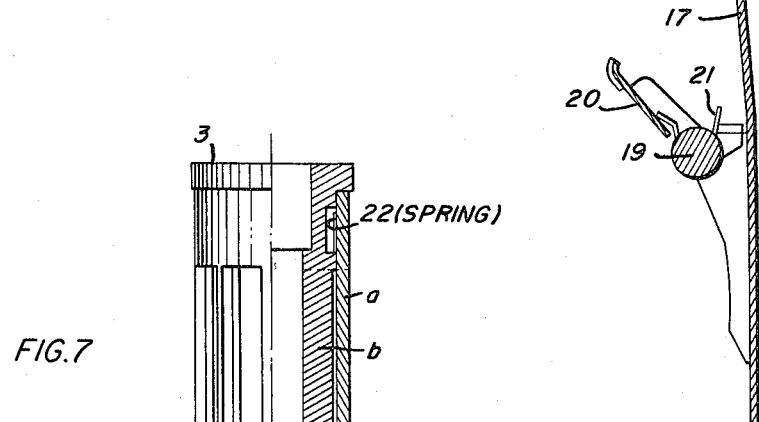
Figure 9:
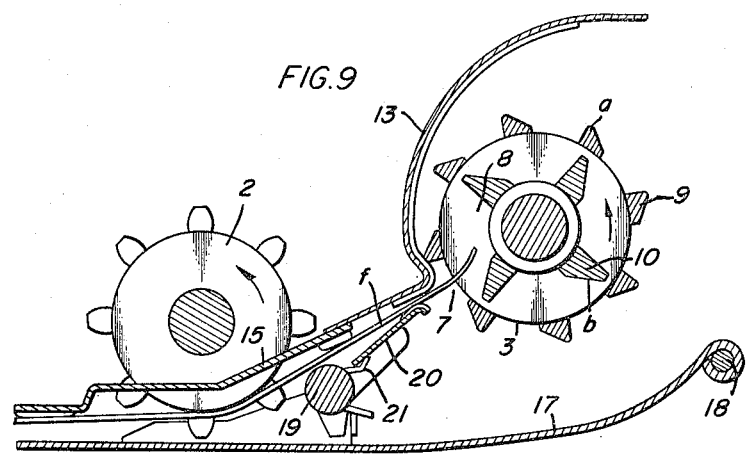
Figure 10:
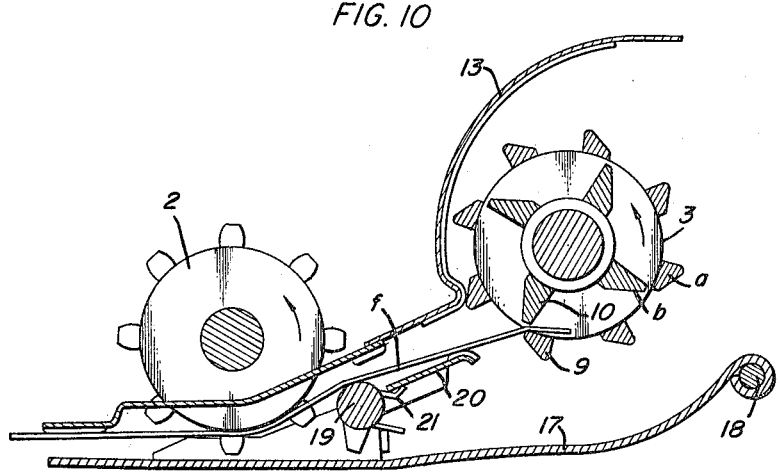

These and other objects, features and advantages of the invention will be apparent from the following description in connection with the attached drawing, wherein FIG. 1 shows in section one embodiment of the film winding device according to the invention, the section being taken along a plane perpendicular to the axis of the reel, FIG. 2 is a similar view to FIG. 1, illustrating the leading edge of a film pinched between outer and inner members, FIG. 3 is a side elevational view of the reel used in the device of FIG. 1, the right half being shown in section, FIGS. 4 and 5 are side elevational views of the outer and inner members, respectively, FIG. 6 shows in section another embodiment illustrating the automatic film loading and winding device according to the invention, FIG. 7 is an elevational view of a reel used in the device of FIG. 6, the right half being shown in longitudinal section, FIGS. 8 to 10 are sections similar to FIG. 6 illustrating the device shown in FIG. 6 at different stages of operation.

Referring to FIGS. 1 to 5, a casing 1 of photographic camera houses a sprocket wheel 2 and a film winding reel 3. As shown in FIGS. 3 to 5, the reel 3 comprises an outer member $a$ and an inner member $b$ adapted to fit in the former. A spring plate 4 is arranged in the casing 1 so as not to move relative to the outer member $a$ and presses against the flange 5 of the latter with its projections 6. The frictional force between the flange 5 and the projections 6 is so chosen as to overcome any friction between the members $a$ and $b$ and to hold the outer member $a$ stationary when the inner member $b$ is caused to rotate. It should be noted that the flange 5 may be omitted in a modification by the provision of a coiled compression spring, not shown, abutting against the end face of the outer member $a$. The members $a$ and $b$ are each provided with a plurality of slots 7 and 8, respectively, on their periphery, so that the leading end $f$ of the film may pass through one of these slots whenever the members stay at rest. To this end, ribs 9 and 10 of the members forming such slots are preferably formed to have a suitable inclination 11, 12 or curvature along their contour in order to facilitate the advance of the film edge therethrough.

The film may be wound around the outer member $a$ by rotating the reel 3 either in the same direction as the rotational direction of the spool in the cartridge or in the opposite direction. Such windings are referred to herein as forward and reverse winding, respectively.

For forward winding, the number of the ribs 10 is preferably reduced in order to facilitate the advance of the film edge deep into the reel 3. In one example, four of the ribs 10 are provided, while the outer member $a$ may include as many ribs as eight, twelve or sixteen.

In case of reverse winding, such deep advance of the film edge inside the reel is undesirable, since it may cause a disturbance to the easy removal of the film from the reel 3 when the film is rewound or unreeled. In addition, since, in this case, the film edge is forced to rotate in a direction opposite to its natural curliness, there is a possibility that it might be pushed outwardly from the slot 7, which should be minimized. The inventors have found that above disadvantages may be avoided by providing an equal number of the ribs 9 and 10 and by restricting the distance between adjacent ribs 10 at their outer periphery to nearly 4 mm.

In operation, a cartridge is fitted into the camera in usual manner and the leading edge $f$ of the film pulled out therefrom is inserted into one of the slots 7 in the outer member $a$. By the winding operation, that is, by operating the charging lever of a camera which turns shaft $3a$, the film is loaded on the reel 3. Since the outer member $a$ remains stationary on account of friction with the spring plate while the inner member $b$ is rotated, the leading edge *f* of the film passing through the slot 7 and reaching the region of the slot 8 is driven counter-clockwise by the rib 10 to be pinched between the inner surface of the outer member *a* and the rib 10 (FIG. 2). Once the film edge is pinched between the reels, the rotary movement of the inner reel is transmitted to the outer reel *a* through the leading edge *f* of the film. As a consequence, the outer member *a* begins to rotate integrally with the inner member *b* against the frictional force by the spring plate 4. The perforations provided in the film will come to engage with teeth of the sprocket wheel 2 by itself.

The back cover of the camera is closed and the winding is continued until the first picture frame comes to lie in place. During first phase of the winding, the sprocket wheel 2 and the inner member *b* should be driven such that the length of the film fed by the former is equal to that wound around the reel. This ensures to avoid loose winding of the film in the initial phase of the winding operation, which may be caused by the sprocket wheel feeding a greater length of the film than the reel is adapted to accommodate it. As is well known, the film has a curliness by its elasticity of relatively great strength which may also cause the disengagement of the leading edge of the film from between the outer and inner members when the film is not yet firmly held between the members. This is also avoided in the manner mentioned above by proper design of the diameters of the sprocket wheel and the outer member as well as their relative number of rotation.

When the film is rewound or unreeled after a film roll has been exposed, both members are rotated clockwise, that is, in the opposite direction to that they rotate when the film is wound. It will be appreciated that the film end can be easily drawn off from between the members.

It should be apparent that the film winding reel according to the invention can be equally applied to either forward or reverse winding type, though it has been illustrated for the former type only.

As mentioned above, both members *a* and *b* are provided with a plurality of slots to ensure a positive and easy insertion of the film edge so that the reel may be employed for automatic film loading as will be described later with reference to FIGS. 6 to 10. The insertion of the film edge is further facilitated by the fact that the outer reel is held stationary by the spring plate 4. Once the film edge is held pinched between the members, it never fails to be released by accident and the film is tightly and positively wound around the outer member from the beginning of its winding. Thus the film winding reel of the invention is particularly adapted for use in 35 mm. cameras. Moreover, the film winding device according to the invention can be easily substituted for an old one having a single-member reel with a pawl. The single-member reel may be replaced by the reel of the invention, and the only additional element required is the elastic means 4 that prevents free rotation of the outer member. The charging or motion-transmitting mechanism need not be modified, if the diameter of the inner member *b* is selected to be equal to that of the old reel.

Now referring to FIGS. 6 to 10 inclusively, another embodiment of the invention will be described. In these figures, like parts are designated by same reference numerals as used in FIGS. 1 to 5. In this second embodiment constructed as an automatic film loading device, the film winding reel 3 comprises the outer and inner members *a* and *b* as before. It should be noted, however, that in this embodiment the reel is constructed to have a frictional force acting between the outer and inner members of such magnitude that they can rotate integrally, but that the outer member can be held stationary by an external force, for example, a frictional force, applied thereto, thus permitting the rotation of only the inner member *b*. To this end, a spring member 22 (FIG. 7) is tensioned between the members to cause friction. Alternately, a lubricant of the kind having viscosity may be enclosed in a space defined between the members, or the members have only to be fitted with each other. A spring plate 4 similar to that in the preceding embodiment presses against the flange 5 at one end of the outer member *a*. The spring plate 4 serves as a clicking spring and has two diametrically opposite projections 6 each adapted to engage with detent holes 23 provided in the flange 5. The coupling force between the projections 6 and the detent holes 23 is selected to be a little greater than that between the members so as to permit detention or to block further movement of the outer member *a*. As before, the members *a* and *b* are provided with a plurality of ribs 9 and 10, respectively, thereby forming slots 7 and 8. For easy advance of the film edge, the ribs 9 and 10 are formed to have the inclination or curvature at portions 11 or 12, respectively.

A guide member 13 made of spring materials is affixed at one end to the casing 1 by a screw 14. It has a curved shape and normally occupies its position shown in FIG. 6. Adjacent to its free end, the guide member 13 is partly folded back to form a shoulder 13a, against which one of the ribs 9 bears with its edge when the projections 6 engage with the detent holes 23. As a result, the outer member *a* is normally held stationary with one of its slots 7 being open to the advancing film edge. The guide member 13 is adapted to be driven radially outward by the film roll as the latter is gradually wound around the outer reel. A guide plate 15, secured to the casing 1 by a screw 16, extends by the side of the sprocket wheel 2 and cooperates with one end of the guide member 13 to guide and prevent the leading edge *f* of the film from falling into the space between the sprocket wheel and the spool. An intermediate lid 17 is rotatably secured to the casing 1 at one end by a pin 18 and when closed, bears against the screw 16 which also acts as a stop with its other end. The lid 17 rotatably carries a roller 19 which is positioned adjacent to the sprocket wheel 2 and which serves to prevent disengagement of the film strip from the sprocket wheel 2. Another guide plate 20 is mounted on the lid 17 and is biased by a helical spring 21 toward the base of the film. As shown in FIG. 10, the guide plate 20 may be displaced outward, when the leading edge of the film is gripped between the members *a* and *b* and begins to follow the integral rotation of both members.

In operation, the film *f* is set on the sprocket wheel 2 so that its perforations correctly engage with teeth of the sprocket wheel and the leading edge of the film reaches intermediate between the sprocket wheel 2 and the spool 3 as shown in FIG. 8. Then the lid 17 as well as the back cover of the camera, not shown, are closed and the winding operation is initiated. Rotation of the sprocket wheel 2 feeds or advances the film so that its leading edge passes between the guide member 13 and the guide plate 20 to enter into the slot 7 of the outer member *a* and then into the slot 8 of the inner member *b*. At this time, the outer member *a* is retained by engagement of the projections 6 with the holes 23, while the inner member *b* is continuously rotated, so that the leading edge of the film is pushed counter-clockwise by the rib 10 of the inner member *b* to be pinched between the members *a* and *b*. Thereupon, the rotating movement of the inner member *b* is transmitted to the outer member *a* through the film, and the coupling between the two members becomes sufficient to overcome the retaining force for the outer one or to cause the detent holes 23 to get out of its engagement with the projections 6 of the clicking spring plate 4 and thus allowed both members to rotate integrally (FIG. 5). The guide plate 20 is displaced outward by the film *f*, whereafter the film is tightly wound around the outer member *a*.

It will be appreciated that when the film is rewound or unreeled after the completion of taking pictures, it can be easily released from the reel as in the first embodiment.

It should be also understood that the above-mentioned automatic film loading device can be realized equally for the reel of either forward or reverse winding type.

Since the leading edge of the film is held pinched between the positively rotated inner member $b$ and the inner face of the outer member $a$ having a diameter preferably equal to or slightly greater than the outer diameter of the inner member $b$, it cannot be released during the winding of the film. Therefore, a reliable winding operation is assured with simple means. It will be also noted that the film is tightly wound on the reel, thereby eliminating the possibility of unnecessarily rubbing the film face during the winding.

What is claimed is:

1. A film winding device for 35 mm. photographic cameras, comprising a winding shaft mounted for rotation by operation of the charging lever of the camera with which the film winding device is associated, a sprocket wheel arranged in the path of film to be wound for driving engagement therewith, a reel on said shaft, said reel consisting of an outer and an inner cylindrical member each provided on its perimeter with a plurality of slots for allowing the leading edge of the film to advance therethrough, elastic means in contact with said outer member for preventing free rotation of said outer member by friction therewith, and another means for frictionally coupling said inner member with the winding shaft so that the latter provides a slip drive to the inner member, said inner member being rotated after the leading edge of the film has been placed in one of said slots of both said outer and inner members, thereby enabling said leading edge of the film to be held pinched between, and to couple as a unit, said members, said frictionally coupling means allowing the reel to slip on the winding shaft when the winding diameter of the reel has increased substantially.

2. A film winding device for 35 mm. photographic cameras according to claim 1, wherein a guide member of spring material has one end in fixed position and a shoulder against which a rib on said outer member bears to hold it stationary.

3. A film winding device for 35 mm. photographic cameras according to claim 2, wherein a guide plate has one end in fixed position in advance of said sprocket and extends alongside said sprocket to the face of said guide member to prevent the leading edge of said film from falling into the space between said sprocket and said reel.

4. A film winding device for 35 mm. photographic cameras according to claim 1, wherein a guide plate is adapted to bear against said film between said sprocket and said reel, and a spring for so biasing said guide plate.

5. A film winding device for 35 mm. photographic cameras according to claim 1, wherein ribs defining said slots of the members have inclination or curvature formed thereon for easy advance of the leading edge of the film into said slots.

6. A film winding device for 35 mm. photographic cameras according to claim 1, wherein the number of the slots of said inner member is less than the number of the slots of said outer member.

7. A film winding device for 35 mm. photographic cameras according to claim 1, wherein the slots of said inner member are equal in number to the number of the slots of said outer member and wherein the maximum dimension of each of the slots of said inner member along the periphery thereof is limited approximately to 4 mm.

8. A film winding device for 35 mm. photographic cameras according to claim 1, wherein said outer member is provided at its one end with a flange against which said elastic means abuts.

9. A film winding device for 35 mm. photographic cameras according to claims 1, characterized by further provision of a sprocket wheel for feeding the film, said sprocket wheel being driven, during first phase of the winding, in such a manner that a length of the film fed by the sprocket wheel is nearly equal to the length of the film which is wound around the reel.

10. A film winding device for 35 mm. photographic cameras according to claim 1, characterized by further provision of detent means for holding said outer member at a predetermined position, a sprocket wheel for feeding said film, and guide means for holding the film in engagement with said sprocket wheel and for guiding the leading edge of the film into one of the slots of the outer member defined thereby when it is held at said predetermined position.

References Cited
UNITED STATES PATENTS 2,095,849  10/1937  Wittel _____ 242—71.1 X
2,487,479  11/1949  Roehel _____ 242—71.1

FRANK J. COHEN, *Primary Examiner.*

N. L. MINTZ, *Assistant Examiner.*